(12) United States Patent
Zhang et al.

(10) Patent No.: US 12,399,762 B1
(45) Date of Patent: Aug. 26, 2025

(54) HETEROGENEOUS COMPUTING SYSTEMS AND SERVER SYSTEM

(71) Applicant: SUZHOU METABRAIN INTELLIGENT TECHNOLOGY CO., LTD., Jiangsu (CN)

(72) Inventors: Deguang Zhang, Jiangsu (CN); Jingwei Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,099

(22) PCT Filed: Aug. 2, 2024

(86) PCT No.: PCT/CN2024/109621
§ 371 (c)(1),
(2) Date: Mar. 27, 2025

(87) PCT Pub. No.: WO2025/060711
PCT Pub. Date: Mar. 27, 2025

(30) Foreign Application Priority Data

Sep. 19, 2023 (CN) .......................... 202311207617.6

(51) Int. Cl.
*G06F 11/00* (2006.01)
*G06F 11/07* (2006.01)

(52) U.S. Cl.
CPC ...... *G06F 11/0757* (2013.01); *G06F 11/0745* (2013.01); *G06F 11/0793* (2013.01)

(58) Field of Classification Search
CPC .............. G06F 11/0757; G06F 11/076; G06F 11/0745; G06F 11/0793; G06F 11/079
See application file for complete search history.

(56) References Cited

U.S. PATENT DOCUMENTS

| | | | |
|---|---|---|---|
| 2009/0292960 A1* | 11/2009 | Haraden | G06F 11/0745 714/699 |
| 2015/0082080 A1* | 3/2015 | Lin | G06F 11/3041 714/48 |

(Continued)

FOREIGN PATENT DOCUMENTS

| | | |
|---|---|---|
| CN | 1725706 A | 1/2006 |
| CN | 115080479 A | 9/2022 |

(Continued)

OTHER PUBLICATIONS

The search report of counterpart PCT application No. PCT/CN2024/109621 issued on Oct. 16, 2024.

(Continued)

*Primary Examiner* — Katherine Lin
(74) *Attorney, Agent, or Firm* — Scully, Scott, Murphy & Presser, P.C.

(57) ABSTRACT

An external loop compensation apparatus and a method and system thereof, and a non-transitory readable storage medium are provided. The loop compensation apparatus includes a power detection unit, a compensation unit, and an MCU, wherein the power detection unit acquires a power supply parameter of a BUCK-BOOST power supply chip and then feeds back the power supply parameter to the MCU; according to the power supply parameter and a working state of the BUCK-BOOST power supply chip, the MCU determines that the working mode of the compensation unit is a phase compensation mode or a power compensation mode; and the compensation unit compensates for the BUCK-BOOST power supply chip according to a control signal of the MCU.

20 Claims, 3 Drawing Sheets

(56) References Cited

U.S. PATENT DOCUMENTS

2021/0042128 A1   2/2021  Ishida
2021/0216388 A1*  7/2021  Kumar ................. G06F 11/079

FOREIGN PATENT DOCUMENTS

| | | |
|---|---|---|
| CN | 115543872 A | 12/2022 |
| CN | 115688089 A | 2/2023 |
| CN | 115904046 A | 4/2023 |
| CN | 115904772 A | 4/2023 |
| CN | 116521596 A | 8/2023 |
| CN | 116932274 A | 10/2023 |
| JP | 2015225522 A | 12/2015 |

OTHER PUBLICATIONS

The search report of counterpart CN application No. 202311207617.6 issued on Oct. 25, 2023.

* cited by examiner

HETEROGENEOUS COMPUTING SYSTEMS AND SERVER SYSTEM

CROSS-REFERENCE TO RELATED APPLICATION

The present disclosure is a national stage filing under 35 U.S.C. § 371 of international application number PCT/CN2024/109621, filed Aug. 2, 2024, which claims priority to Chinese Patent Application no. 202311207617.6, to the China National Intellectual Property Administration on 19 Sep. 2023 and entitled "Heterogeneous Computing Systems and Server System", which is incorporated herein by reference in its entirety.

TECHNICAL FIELD

Embodiments of the present disclosure relate to the field of computers, and in particular, to a heterogeneous computing system and a server system.

BACKGROUND

With the improvement of the performance of a heterogeneous computing system, users have more and more diversified functional requirements on the heterogeneous computing system, accordingly, Peripheral component interconnect express (PCIe) devices for implementing these functions are becoming more and more diversified, PCIe devices configured for different heterogeneous computing systems are not completely the same, and different PCIe devices have different functions, if a certain PCIe device fails, the corresponding function of the heterogeneous computing system is interrupted or the system breaks down, and the system host is forced to reset, thereby causing serious problems such as loss of important data. Therefore, when a PCIe device in a system fails, how to discover the fault and process the failed PCIe device is an important problem.

SUMMARY

Embodiments of the present disclosure provide a heterogeneous computing system and a server system, so as to at least solve the problem in the related art that a host cannot normally operate due to a PCIe device fault.

According to one embodiment of the present disclosure, provided is a heterogeneous computing system, comprising: a plurality of end points; a processor communicatively connected to the plurality of end points, the processor being configured to determine whether a target end point in the plurality of end points is in a state requiring a reset, intercept, when it is determined that the target end point is in the state requiring a reset, an interrupt signal reported by the target end point to the root complex, and enable the target end point to send a device identifier to a root complex, and the processor further being configured to, upon receipt of storage complete information sent by the root complex, reset the target end point and send reset complete information to the root complex; and the root complex, respectively connected to the plurality of end points, the root complex being configured to receive the device identifier, store current state information corresponding to the device identifier according to the device identifier, send the storage complete information to the processor, and upon receipt of reset complete information, establish a connection with the reset target end point and send the current state information to the target end point.

In an exemplary embodiment, the processor is further configured to: start a counting function of a watchdog timer corresponding to each of the end points, and reset the watchdog timer corresponding to the end point upon receipt of a watchdog feeding signal sent by the end point; determine whether a count value of the watchdog timer corresponding to the target end point exceeds a threshold; in cases when the count value of the watchdog timer corresponding to the target end point exceeds the threshold, determine that the target end point fails, and determine that the target end point is in the state requiring a reset.

In an exemplary embodiment, the processor is further configured to: disable the counting function of the watchdog timer corresponding to the target end point in cases when it is determined that the target end point has failed; and restore the counting function, corresponding to the target end point, of the watchdog timer after sending reset complete information to the root complex.

In an exemplary embodiment, the end point is further configured to send a heartbeat signal to the processor at an interval of a first predetermined duration, and the processor is further configured to: determine, at an interval of a first predetermined duration, whether the heartbeat signal sent from each end point is received; and in cases when the heartbeat signal is not received, determine that the end point which does not receive the heartbeat signal is the target end point, and determine that the target end point fails and in the state requiring a reset.

In an exemplary embodiment, the processor is further configured to determine whether reset request information of an operating system of the target end point is received, the reset request information being information generated by the operating system after software of the target end point is updated, and the reset request information being used for requesting to reset the target end point; and determine that the target end point is in the state requiring a reset in cases upon receipt of the reset request information.

In an exemplary embodiment, the reset request information is generated by the operating system in response to a predetermined operation acting on a man-machine interface, the predetermined operation being an operation of feeding back query information displayed on the man-machine interface, the query information being generated by a basic input output system and sent to the operating system in cases when software of the target end point is updated, and the query information being used for querying whether the operating system is reset after the software is updated.

In an exemplary embodiment, the processor is further configured to intercept error report information sent by the target end point to the root complex, the error report information comprising the interrupt signal, the device identifier, an error type, an error address, and an error source; mask the interrupt signal in the error report information, wherein the error report information after the interrupt signal is masked forms masked information; and send the masked information to the root complex.

In an exemplary embodiment, the processor is further configured to generate an error log on the basis of the device identifier, the error type, the error address and the error source after the error report information sent by the target end point to the root complex has been intercepted.

In an exemplary embodiment, the processor is further configured to: determine, after the target end point is reset, whether the target end point is in the state requiring a reset; in cases when it is determined that the target end point is in the state requiring a reset, control the consecutive reset count corresponding to the target end point to increment by one; in cases when it is determined that the target end point is not in the state requiring a reset, control the consecutive reset count to be reset to zero; determine whether the consecutive reset count is greater than or equal to a predetermined threshold; and in cases when it is determined that the consecutive reset count is greater than or equal to the predetermined threshold, not intercept the interrupt signal.

In an exemplary embodiment, the root complex is further configured to perform resetting in response to the interrupt signal upon receipt of the interrupt signal.

In an exemplary embodiment, the processor is further configured to: intercept the interrupt signal in cases when it is determined that the target end point is in the state requiring a reset and the consecutive reset count corresponding to the target end point is less than the preset threshold.

In an exemplary embodiment, the processor is further configured to: control the target end point to reset; or restore register state information corresponding to a downstream port of the target end point to an initial state.

In an exemplary embodiment, the current state information comprises the configuration space information, base address register (BAR) space mapping relationship, and memory space information of the target end point.

In an exemplary embodiment, the root complex is further configured to: store the configuration space information, BAR space mapping relationship and memory space information corresponding to the device identifier to a hard disk according to the device identifier.

In an exemplary embodiment, the root complex is further configured to: scan the reset target end point according to the device identifier, so as to restore a communication connection with the target end point; read the current state information from the hard disk drive by means of a memory; and send the read current state information to the target end point.

In an exemplary embodiment, the root complex is further configured to disconnect the connection with the target end point in cases when the current state information has been stored.

In an exemplary embodiment, the root complex is in communication connection with the end points by means of a PCIe link.

In an exemplary embodiment, the root complex is further configured to: before storing the current state information according to the device identifier, scan the PCIe link using a depth-first-search algorithm, and allocate an address space to each of the end points.

In an exemplary embodiment, an end point comprises: a system-on-chip configured to run one of an Orin (an NVIDIA Jetson series computing module, mainly used for automatic driving) platform and an NV (an NVIDIA Jetson series computing module, such as those applied to an edge computing box) platform.

In an exemplary embodiment, the processor comprises a base board management controller.

According to another embodiment of the present disclosure, also provided is a server system, comprising any heterogeneous computing system.

By means of the embodiments of the present disclosure, when determining that a target end point needs to be reset due to a fault or upgrade, a processor intercepts an interrupt signal reported by the target end point to a root complex, preventing the root complex from receiving the interrupt signal, which could cause the root complex to fail or even crash and reset, thereby ensuring that the root complex can continue to operate normally during the fault handling process. Furthermore, the processor does not intercept the device identifier sent by the target device to the root complex, so that the root complex stores state information of the target end point corresponding to the device identifier; after the storage is completed, the processor is notified to reset the target end point; and after the reset is completed, the root complex recovers the state information thereof, thereby ensuring that the data of the target end point is not lost during the fault handling process.

The drawings include the following reference signs:
30: end point; 31: root complex; 32: processor; 33: PCIe switching device.

DETAILED DESCRIPTION OF THE EMBODIMENTS

The embodiments of the present disclosure are described in detail with reference to the accompanying drawings and in conjunction with the embodiments.

It is to be noted that terms "first", "second" and the like in the description, claims and the above-mentioned drawings of the present disclosure are used for distinguishing similar objects rather than describing a specific sequence or a precedence order.

Figure 1:
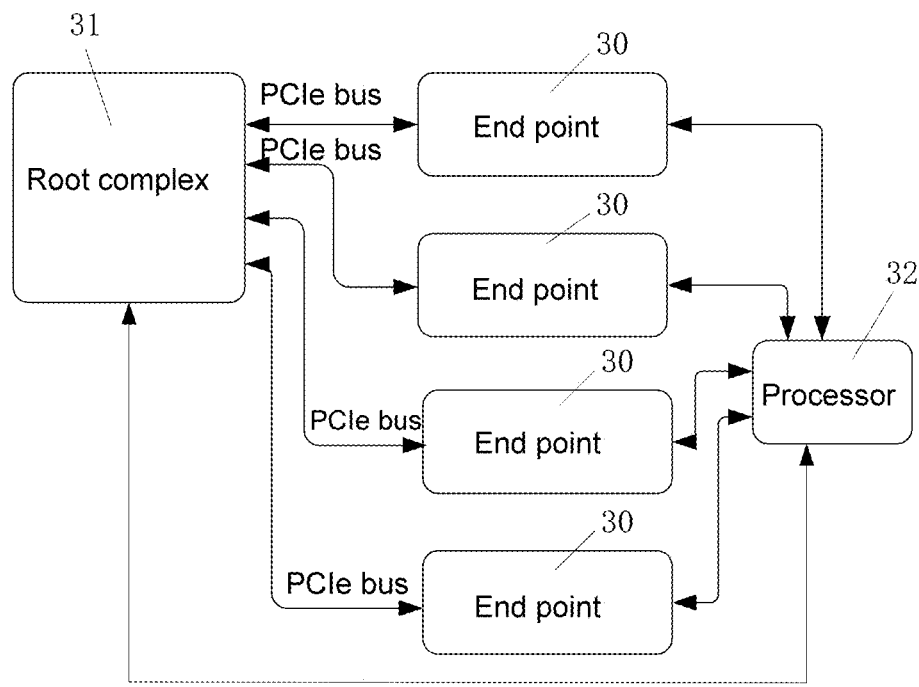
FIG. 1 is a structural diagram of a heterogeneous computing system according to an embodiment of the present disclosure.

The present embodiment provides a heterogeneous computing system. FIG. 1 is a schematic diagram of a heterogeneous computing system according to an embodiment of the present disclosure. As shown in FIG. 1, the heterogeneous computing system comprises:

a plurality of end points 30.

Optionally, the end point may be any suitable type of device. For example, the end point may be a PCIe device, may be a system-on-chip, and is configured to run an Orin platform (an NVIDIA Jetson series computing module, mainly used for automatic driving) or an NV platform (an NVIDIA Jetson series computing module, such as those applied to an edge computing box).

The heterogeneous computing system also comprises a processor 32, communicatively connected to the plurality of end points, the processor is configured to determine whether a target end point among the plurality of end points is in a state requiring a reset, intercept, when it is determined that the target end point is in the state requiring a reset, an interrupt signal reported by the target end point to the root complex, and enable the target end point to send a device identifier to a root complex, and the processor is further configured to, upon receipt of storage complete information sent by the root complex, reset the target end point and send reset complete information to the root complex.

Optionally, the target end point may be any one of a plurality of end points. The state requiring a reset includes a state requiring a reset due to a fault, and can further include a state requiring a reset due to software upgrade. The storage complete information is used to represent that storage of the current state information is completed.

The heterogeneous computing system also comprises the root complex 31, respectively connected to the plurality of end points, the root complex is configured to receive the device identifier, store current state information corresponding to the device identifier according to the device identifier, send the storage complete information to the processor, and upon receipt of reset complete information, establish a connection with the reset target end point and send the current state information to the target end point, Optionally, the root complex may be a server host, in cases when the target end point is in the state requiring a reset, fault information and an interrupt signal are generated to trigger an interrupt handling process, and the interrupt signal easily causes an anomalous interrupt or even resetting of a root complex service.

By means of the system, the processor determines whether a target end point is in a state requiring a reset; in cases when it is determined that the target end point is in the state requiring a reset, the processor intercepts an interrupt signal reported by the target end point to a root complex, so that the target end point sends the device identifier corresponding thereto to the root complex; and according to the device identifier, the root complex stores current state information of the target end point corresponding to the device identifier, and in cases when the storage is completed, sends storage complete information to the processor to trigger the processor to reset the target end point, thereby realizing the repairing of the target end point, and then sends reset complete information of the target end point to the root complex, so that the root complex establishes a connection with the reset target end point and recovers the state information of the target end point. Compared with the problem in the related art that a host cannot run normally due to a PCIe device fault, when determining that a target end point needs to be reset due to a fault or upgrade, the processor of the present disclosure intercepts an interrupt signal reported by the target end point to a root complex, preventing the root complex from receiving the interrupt signal, which could cause the root complex to fail or even crash and reset, thereby ensuring that the root complex can continue to operate normally during the fault handling process. Furthermore, the processor does not intercept the device identifier sent by the target device to the root complex, so that the root complex stores state information of the target end point corresponding to the device identifier; after the storage is completed, the processor is notified to reset the target end point; and after the reset is completed, the root complex recovers the state information thereof, thereby ensuring that the data of the target end point is not lost during the fault handling process.

In an optional solution, the processor is further configured to: start a counting function of a watchdog timer corresponding to each of the end points, and reset the watchdog timer corresponding to the end point upon receipt of a watchdog feeding signal sent by the end point; determine whether a count value of the watchdog timer corresponding to the target end point exceeds a threshold; in cases when the count value of the watchdog timer corresponding to the target end point exceeds the threshold, determine that the target end point fails, and determine that the target end point is in the state requiring a reset. The processor monitors whether the end point feeds a watchdog at a regular time by providing a watchdog timer, and can accurately and timely determine whether each end point has a fault, thereby realizing fault positioning.

In order to normally monitor the plurality of end points, the processor is further configured to: before starting a counting function of the watchdog timer corresponding to each end point, establish a communication connection with the plurality of end points.

In addition to monitoring the state of the end point by means of the described method, in other embodiments, the device state of the end point is bound to a heartbeat signal, and the end point is further configured to send a heartbeat signal to the processor at an interval of a first predetermined duration, and the processor may be further configured to: determine, at an interval of a first predetermined duration, whether the heartbeat signal sent from each end point is received; and in cases when the heartbeat signal is not received, determine that the end point which does not receive the heartbeat signal is the target end point, and determine that the target end point fails and in the state requiring a reset. The processor monitors, by means of the periodic heartbeat signal, whether a fault occurs in the end point, and can accurately and timely determine whether a fault occurs in each end point, thereby realizing fault positioning.

In addition, the processor is further configured to: disable the counting function of the watchdog timer corresponding to the target end point in cases when it is determined that the target end point has failed. In this way, the problem that the watchdog timer frequently reports an error during the fault handling process can be avoided. The processor is further configured to restore the counting function, corresponding to the target end point, of the watchdog timer after sending reset complete information to the root complex. This can achieve continuous monitoring of the target end point after recovery.

In addition to a state requiring a reset due to a fault, it also may be a state requiring a reset due to software upgrades, in order to monitor the state requiring a reset, in some exemplary embodiments of the present disclosure, the processor is further configured to determine whether reset request information of an operating system (OS) of the target end point is received, the reset request information being information generated by the operating system after software of the target end point is updated, and the reset request information being used for requesting to reset the target end point; and determine that the target end point is in the state requiring a reset in cases upon receipt of the reset request information. In this embodiment, the processor determines whether the target end point is in a state requiring a reset by determining whether reset request information, that is actively initiated by the target end point and used for requesting resetting, is received.

Optionally, the reset request information is generated by the operating system in response to a predetermined operation acting on a man-machine interface, the predetermined operation being an operation of feeding back query information displayed on the man-machine interface, the query information being generated by a basic input output system (BIOS) and sent to the operating system in cases when software of the target end point is updated, and the query information being used for querying whether the operating system is reset after the software is updated. In the present embodiment, the end point performs software upgrade by means of the BIOS; after the upgrade is completed, the BIOS sends, to the operating system of the end point, query information about whether to perform resetting; and the operating system presents the query information to the relevant personnel by means of the human-machine interface, so that in cases when the relevant personnel selects resetting by means of a predetermined operation, the operating system generates reset request information in response to the predetermined operation.

Optionally, the predetermined operation may be any operation mode acting on the man-machine interface, such as clicking, double-clicking, long-pressing, and sliding, and the predetermined operation represents an operation to reset the operating system. In addition, in cases when the relevant personnel selects, by means of the operating system, not to reset the operating system, or in cases when the relevant personnel does not operate within a second predetermined duration, the operating system does not generate reset request information.

In order to avoid the problem of host breakdown or reset caused by a fault of an end point, according to some embodiments of the present disclosure, the processor is further configured to: intercept error report information sent by the target end point to the root complex, the error report information comprising the interrupt signal, the device identifier, an error type, an error address, and an error source; mask the interrupt signal in the error report information, wherein the error report information after the interrupt signal is masked forms masked information; and send the masked information to the root complex. By masking the interrupt signal in error report information and then sending same to the root complex, the root complex can receive other error report information other than the interrupt signal, so that the root complex learns an end point in which an error has occurred, and stores corresponding data.

Optionally, the post-masked information is used to trigger the root complex to store the current state information of the target end point in which an error has occurred.

In order to facilitate the subsequent fault tracing, in another embodiment, the processor is further configured to generate an error log on the basis of the device identifier, the error type, the error address and the error source after the error report information sent by the target end point to the root complex has been intercepted.

In practical disclosures, a PCIe bus supports advanced error reporting (AER), and can detect and report a bus fault and a device error in time, thereby improving the stability and reliability of a PCIe architecture, and correspondingly, a system restart or software fix may be caused due to anomaly of some systems. When an error has occurred in the PCIe device, such as a transmission error or a bus error in data transmission, the device may send an error report message to the location indicated by the AER working mechanism. The AER mechanism records the received error report message, including information such as an error type, an error address, and an error source. The AER mechanism transmits the error report message to the operating system, so that the system can perform appropriate error handling work, and can also transmit the error message to the BIOS for handling. The operating system may handle an error, for example, restart the PCIe device or fix a fault using software, so as to keep the system stable.

In still other optional embodiments, the processor is further configured to: the processor is further configured to: determine, after the target end point is reset, whether the target end point is in the state requiring a reset; in cases when it is determined that the target end point is in the state requiring a reset, control the consecutive reset count corresponding to the target end point to increment by one; in cases when it is determined that the target end point is not in the state requiring a reset, control the consecutive reset count to be reset to zero; determine whether the consecutive reset count is greater than or equal to a predetermined threshold; and in cases when it is determined that the consecutive reset count is greater than or equal to the predetermined threshold, not intercept the interrupt signal. Accordingly, the root complex is further configured to perform resetting in response to the interrupt signal upon receipt of the interrupt signal. In an actual disclosure process, the fault types of the end point include a recoverable fault and an unrecoverable fault, some unrecoverable faults cannot be fixed by means of a reset, and therefore, if the processor of the present disclosure remains in a state requiring a reset even after multiple reset attempts of the target end point, it indicates that the reset cannot fix the fault of the target end point, and in this case, the processor will no longer reset the target end point or intercept interrupt signals, this allows the root complex to receive the interrupt signal and perform a restart reset, ensuring high fault-handling efficiency in the heterogeneous computing system while also ensuring the data processing security of the heterogeneous computing system.

In addition, in cases when the consecutive reset count is less than a predetermined threshold, it indicates that the target end point still has a possibility of being fixed by a reset. In this case, the processor is further configured to intercept the interrupt signal in cases when it is determined that the target end point is in the state requiring a reset and the consecutive reset count corresponding to the target end point is less than the preset threshold. In this way, it can prevent the root complex from receiving the interrupt signal, which could cause the root complex to fail or even crash and reset, thereby ensuring that the root complex can continue to operate normally during the fault handling process.

In order to achieve the flexible reset of the target end point, in an exemplary embodiment, the processor is further configured to control the target end point to reset; or restore register state information corresponding to a downstream port of the target end point to an initial state.

In the embodiments of the present disclosure, the current state information comprises the configuration space information, BAR space mapping relationship, and memory space information of the target end point. In cases when the target end point is in a state requiring a reset, the root complex stores the configuration space information, BAR space mapping relationship, and memory space information of the target end point, thereby avoiding the problem that the current running data of the target end point is lost after the target end point is reset.

In an exemplary embodiment of the present disclosure, the root complex is further configured to: store the configuration space information, BAR space mapping relationship and memory space information corresponding to the device identifier to a hard disk according to the device identifier. In cases when the target end point is in a state requiring a reset, the root complex stores the configuration space information, BAR space mapping relationship, and memory space information of the target end point, thereby avoiding the problem that the current running data of the target end point is lost after the target end point is reset.

In order to ensure the data security during fault handling, according to some optional solutions, the root complex is further configured to: scan the reset target end point according to the device identifier, so as to restore a communication connection with the target end point; read the current state information from the hard disk drive by means of a memory; and send the read current state information to the target end point. In the present embodiment, in cases when the connection with the target end point is restored, the root complex first reads data, that needs to be restored, from a hard disk into a memory, and then sends the data from the memory to the target end point, thereby implementing data restoration on a reset target end point.

Optionally, the root complex is further configured to disconnect the connection with the target end point in cases when the current state information has been stored. Thus, the target end point that needs to be restarted is isolated.

The root complex may use any suitable type of communication link to perform communication connection with each end point. In the present disclosure, each end point is a PCIe device, and the root complex is in communication connection with each end point by means of the PCIe link.

The root complex is further configured to: before storing the current state information according to the device identifier, scan the PCIe link using a depth-first-search algorithm, and allocate an address space to each of the end points. The root complex performs peripheral component interconnect (PCI) scanning on the PCIe end point to allocate an address space to each end point, thereby implementing connection to the PCIe link of each end point.

In practical disclosures, the processor may be any suitable type of processor, such as a central processing unit (CPU) and a micro control unit (MCU). In the present disclosure, the processor includes a base board management controller (BMC). The processor is a base board management controller.

Optionally, the end point comprises: a system-on-chip configured to run one of an Orin platform and an NV platform.

Optionally, the heterogeneous computing system, as a heterogeneous computing platform, is a computing system integrating different computing resources such as a CPU, a Graphics Processing Unit (GPU), a Field Programmable Gate Array (FPGA), and an Disclosure Specific Integrated Circuit (ASIC), and uses different resources to implement high-performance disclosures. The Jetson of the NVIDIA is an artificial intelligence (AI) computing platform with low power consumption, which can support high-performance machine learning, computer vision, and graphics processing disclosures. The Jetson computing platform is a system-on-chip (SoC), which comprises computing resources such as an NVIDIA GPU and an ARM CPU, and implements rapid deployment and intelligent disclosures. The Jetson platform of the NVIDIA deployment on a single computing node and also allows the PCIe bus resources thereof to be configured in an end point mode (i.e. PCIe End Point mode), thereby forming a system with a stronger computational resource. Compared with computing nodes interconnected using an Ethernet, a system interconnecting a host computing node (Host) and a heterogeneous computing node (Jetson) using a PCIe bus has a lower data transmission delay, so that a multi-node computing platform can obtain higher performance.

Figure 2:
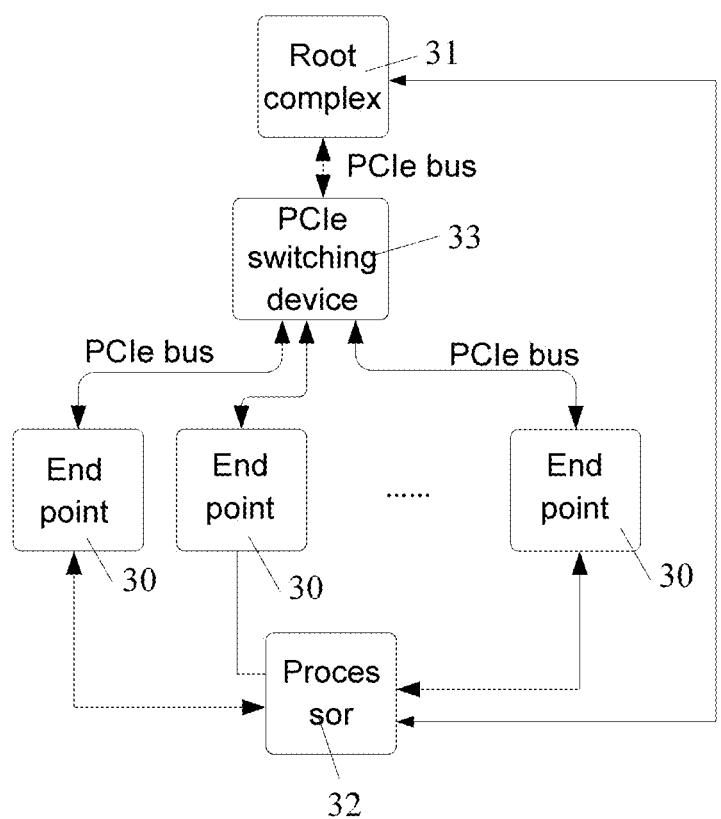
FIG. 2 is another schematic structural diagram of a heterogeneous computing system according to an embodiment of the present disclosure.

In another embodiment, as shown in FIG. 2, the heterogeneous computing system further includes a PCIe switching (Switch) device 33, and the root complex is connected to the plurality of end points 30 by means of the PCIe switching device 33.

Optionally, the root complex is integrated in the server host. In practical disclosure processes, a heterogeneous computing platform based on a server host and anSoC (configured as a PCIe end point) may experience technical problems where the PCIe end point fails due to the SoC running an operating system and algorithm software. This is limited by the general characteristics of the PCIe bus architecture, which can subsequently cause the entire computing platform to crash or restart. In particular, in cases when a plurality of SoCs are used as PCIe EPs, the redundancy reliability of the entire computing platform is multiplied. Based on the results of system experimental tests, it has been found that the computing platform experiences significantly fewer faults caused by the PCIe bus hardware compared to system crashes or restarts caused by the SoC running the operating system and software. Therefore, the heterogeneous computing system of the present disclosure is proposed.

Exemplarily, in cases when the processor is a BMC, the end point is connected to the BMC using a GPIO to implement heartbeat detection, and a pulse (a heartbeat) with a certain frequency, for example, one pulse per second, may be set according to an actual requirement of a system. The end point binds the device state thereof to the heartbeat signal, and the BMC can clearly recognize the state of the end point node. There is a communication link between the BMC and the host, that is, information of the faulty end point is fed back by means of the communication link.

Figure 3:
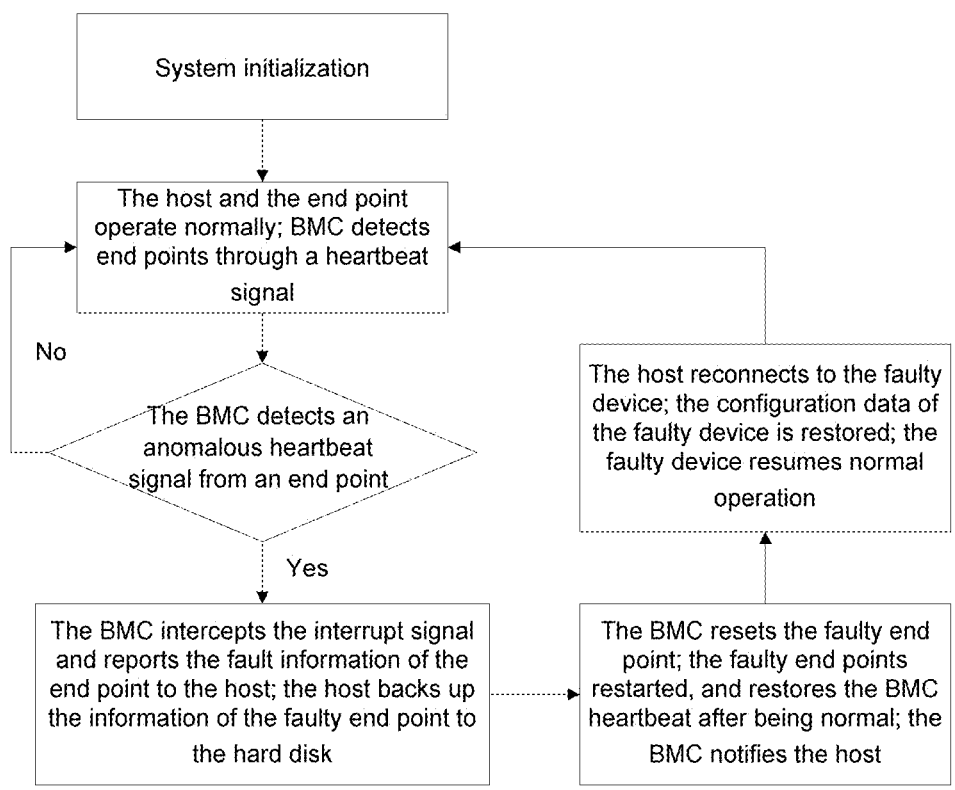
FIG. 3 is a fault handling flowchart of a heterogeneous computing system according to an embodiment of the present disclosure.

As shown in FIG. 3, system initialization, the host and the end point operate normally. BMC detects end points through a heartbeat signal, the BMC detects whether an anomalous heartbeat signal from an end point, when detecting an anomalous heartbeat signal from an end point, the BMC intercepts the interrupt signal and reports the fault information of the end point to the host; the host backs up the information of the faulty end point to the hard disk. The BMC resets the faulty end point; the faulty end points restarted, and restores the BMC heartbeat after being normal; the BMC notifies the host. The host reconnects to the faulty device; the configuration data of the faulty device is restored; the faulty device resumes normal operation. The host performs PCI scanning on the end point, assigns a bus number to the end point on the basis of a depth-first search algorithm (DFS) algorithm, and completes configuration of a configuration space. When the end point fails, the BMC only records information such as an error type, an error address, and an error source in the AER, and masks an interrupt signal. Meanwhile, the host stores the related data such as the configuration space information, BAR space mapping, and memory space information of the faulty end point into the hard disk. The host notifies the BMC after the information processing of the faulty end point stored in the memory is completed. In this case, the BMC initiates a restart control on the faulty end point node, notifies the BMC after the restart is completed, and notifies the host by means of the BMC. The host re-initiates a PCI scanning command on the restarted end point node, obtains the node again, and restores the related information of the previously faulty end point.

According to another aspect of the present disclosure, also provided is a server system. The server system comprises any heterogeneous computing system.

The server system comprises any heterogeneous computing system. By means of the heterogeneous computing system, when determining that a target terminal device needs to be reset due to a fault or upgrade, a processor intercepts an interrupt signal reported by the target terminal device to a root complex, preventing the root complex from receiving the interrupt signal, which could cause the root complex to fail or even crash and reset, thereby ensuring that the root complex can continue to operate normally during the fault handling process. Furthermore, the processor does not intercept the device identifier sent by the target device to the root complex, so that the root complex stores state information about a target end point corresponding to the device identifier, after the storage is completed, the processor is notified to reset the target end point, and after the reset is completed, the root complex recovers the state information thereof. This ensures that the data of the target end point is not lost during the fault handling process, thereby ensuring the reliability of the server system in running.

From the description of the described embodiments, a person skilled in the art would have been able to clearly understand that the method in the described embodiments may be implemented by using software and necessary general hardware platforms, and of course may also be implemented using hardware, but in many cases, the former is a better embodiment. Based on such understanding, the essence of technical solution of the embodiments of the present disclosure, or in other words, the part of the technical solutions making contributions to the prior art, may be embodied in the form of a software product stored in a storage medium (such as a Read-Only Memory (ROM)/Random Access Memory (RAM), a magnetic disk and an optical disc), including a number of instructions for enabling an end point (which may be a mobile phone, a computer, a server, or a network device, etc.) to perform the methods described in various embodiments of the present disclosure.

It should be noted that the modules above may be implemented by software or hardware, and the latter may be implemented in the following manner, but is not limited thereto. All the modules above are located in the same processor; or all the modules above are located in different processors in any arbitrary combination manner.

For specific examples in the present embodiment, reference can be made to the examples described in the described embodiments and exemplary embodiments, and thus they will not be repeated again in the present embodiment.

Obviously, those skilled in the art should understand that the modules or steps in the present disclosure can be implemented by using a general computing device, and they can be integrated in a single computing device, and can also be distributed over a network consisting of a plurality of computing devices. They may be implemented by using executable program codes of the computing devices. Thus, they can be stored in a storage device and executed by the computing devices. Furthermore, in some cases, the shown or described steps may be executed in an order different from that described here, or they can be respectively implemented by individual Integrated Circuit modules, or they can be implemented by making a plurality of the modules or steps into a single Integrated Circuit module. Hence, the present disclosure is not limited to any specific combinations of hardware and software.

The content above merely relates to preferred embodiments of the present disclosure and is not intended to limit the present disclosure. For a person skilled in the art, the present disclosure may have various modifications and variations. Any modifications, equivalent replacements, improvements, etc. made within the principle of the present disclosure shall all belong to the scope of protection of the present disclosure.

What is claimed is:

1. A heterogeneous computing system, comprising:
   a plurality of end points;
   a processor, communicatively connected to the plurality of end points, the processor is configured to determine whether a target end point in the plurality of end points is in a state requiring a reset, intercept, when it is determined that the target end point is in the state requiring a reset, an interrupt signal reported by the target end point to the root complex, and enable the target end point to send a device identifier to a root complex, and the processor is further configured to, upon receipt of storage complete information sent by the root complex, reset the target end point and send reset complete information to the root complex; and
   the root complex, respectively connected to the plurality of end points, the root complex is configured to receive the device identifier, store current state information corresponding to the device identifier according to the device identifier, send the storage complete information to the processor, and upon receipt of reset complete information, establish a connection with the reset target end point and send the current state information to the target end point.

2. The system according to claim 1, wherein the processor is further configured to:
   start a counting function of a watchdog timer corresponding to each of the end points, and reset the watchdog timer corresponding to the end point upon receipt of a watchdog feeding signal sent by the end point;
   determine whether a count value of the watchdog timer corresponding to the target end point exceeds a threshold;
   in cases when the count value of the watchdog timer corresponding to the target end point exceeds the threshold, determine that the target end point fails, and determine that the target end point is in the state requiring a reset.

3. The system according to claim 2, wherein the processor is further configured to:
   disable the counting function of the watchdog timer corresponding to the target end point in cases when it is determined that the target end point has failed; and
   restore the counting function, corresponding to the target end point, of the watchdog timer after sending reset complete information to the root complex.

4. The system according to claim 1, wherein the end point is further configured to send a heartbeat signal to the processor at an interval of a first predetermined duration, and the processor is further configured to:
   determine, at an interval of a first predetermined duration, whether the heartbeat signal sent from each end point is received; and
   in cases when the heartbeat signal is not received, determine that the end point which does not receive the heartbeat signal is the target end point, and determine that the target end point fails and in the state requiring a reset.

5. The system according to claim 1, wherein the processor is further configured to:
   determine whether reset request information of an operating system of the target end point is received, the reset request information being information generated by the operating system after software of the target end point is updated, and the reset request information being used for requesting to reset the target end point; and
   determine that the target end point is in the state requiring a reset in cases upon receipt of the reset request information.

6. The system according to claim 5, wherein the reset request information is generated by the operating system in response to a predetermined operation acting on a man-machine interface, the predetermined operation being an operation of feeding back query information displayed on the man-machine interface, the query information being generated by a basic input output system and sent to the operating system in cases when software of the target end point is updated, and the query information being used for querying whether the operating system is reset after the software is updated.

7. The system according to claim 1, wherein the processor is further configured to:
intercept error report information sent by the target end point to the root complex, the error report information comprising the interrupt signal, the device identifier, an error type, an error address, and an error source;
mask the interrupt signal in the error report information, wherein the error report information after the interrupt signal is masked forms masked information; and
send the masked information to the root complex.

8. The system according to claim 7, wherein the processor is further configured to generate an error log on the basis of the device identifier, the error type, the error address and the error source after the error report information sent by the target end point to the root complex has been intercepted.

9. The system according to claim 1, wherein the processor is further configured to:
determine, after the target end point is reset, whether the target end point is in the state requiring a reset;
in cases when it is determined that the target end point is in the state requiring a reset, control the consecutive reset count corresponding to the target end point to increment by one;
in cases when it is determined that the target end point is not in the state requiring a reset, control the consecutive reset count to be reset to zero;
determine whether the consecutive reset count is greater than or equal to a predetermined threshold; and
in cases when it is determined that the consecutive reset count is greater than or equal to the predetermined threshold, not intercept the interrupt signal.

10. The system according to claim 9, wherein the root complex is further configured to perform resetting in response to the interrupt signal upon receipt of the interrupt signal.

11. The system according to claim 9, wherein the processor is further configured to:
intercept the interrupt signal in cases when it is determined that the target end point is in the state requiring a reset and the consecutive reset count corresponding to the target end point is less than the preset threshold.

12. The system according to claim 1, wherein the processor is further configured to:
control the target end point to reset; or
restore register state information corresponding to a downstream port of the target end point to an initial state.

13. The system according to claim 1, wherein the current state information comprises the configuration space information, base address register (BAR) space mapping relationship, and memory space information of the target end point.

14. The system according to claim 1, wherein the root complex is further configured to:
store the configuration space information, BAR space mapping relationship and memory space information corresponding to the device identifier to a hard disk according to the device identifier.

15. The system according to claim 14, wherein the root complex is further configured to:
scan the reset target end point according to the device identifier, so as to restore a communication connection with the target end point;
read the current state information from the hard disk drive by means of a memory; and
send the read current state information to the target end point.

16. The system according to claim 1, wherein the root complex is further configured to:
disconnect the connection with the target end point in cases when the current state information has been stored.

17. The system according to claim 1, wherein the root complex is in communication connection with the end points by means of a peripheral component interconnect express (PCIe) link.

18. The system according to claim 17, wherein the root complex is further configured to:
before storing the current state information according to the device identifier, scan the PCIe link using a depth-first-search algorithm, and allocate an address space to each of the end points.

19. The system according to claim 1, wherein the end point comprises a system-on-chip configured to run one of an Orin platform and an NV platform.

20. The system according to claim 1, wherein the processor comprises a base board management controller.

* * * * *